June 24, 1930. T. E. BAKER 1,766,581
ART OF AND MEANS FOR MEASURING LIQUIDS
Filed May 8, 1926
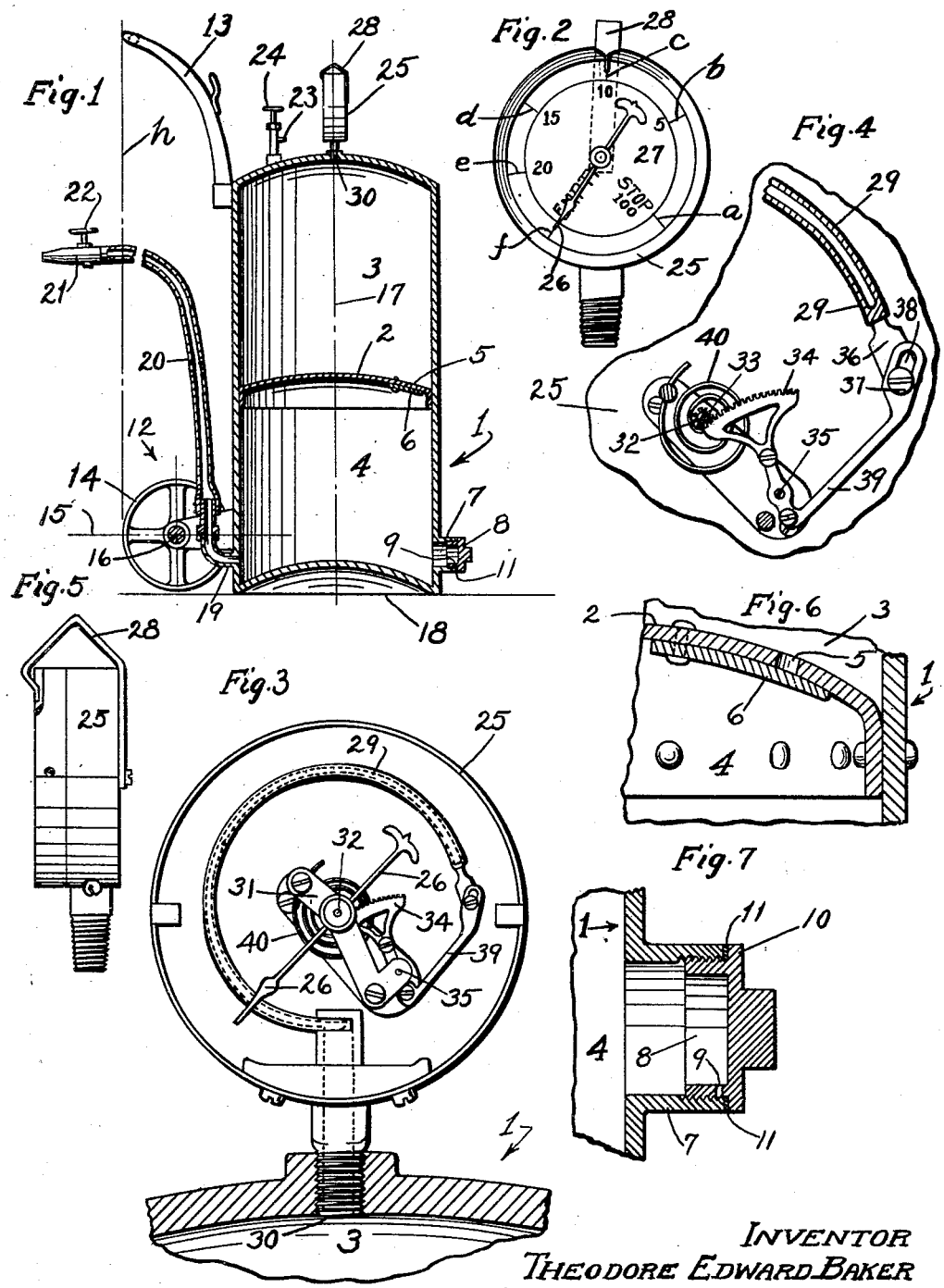
INVENTOR
THEODORE EDWARD BAKER
by James R. Townsend
his atty
WITNESS
Robt. S. Woolsey Patented June 24, 1930

1,766,581

UNITED STATES PATENT OFFICE

THEODORE EDWARD BAKER, OF LONG BEACH, CALIFORNIA, ASSIGNOR TO AERO LIQUID METER CORPORATION, OF LOS ANGELES, CALIFORNIA, A CORPORATION OF CALIFORNIA

ART OF AND MEANS FOR MEASURING LIQUIDS

Application filed May 8, 1926. Serial No. 107,644.

I have discovered that the measurement of the amount of liquids discharged from a container can be made in a highly satisfactory manner by discharging the liquid by means of a predetermined volume of compressed air in the container, and determining the volume of liquid discharged from the container by measuring the reduced pressure of the air as the air increases in volume to compensate the displacement of the liquid.

By using compressed air as a factor, both for dispensing the liquid, and for operating mechanism to indicate in terms of liquid measure, the volume of liquid dispensed, I am able to do the work rapidly and satisfactorily through the medium of a light, portable and easily operated apparatus, which I have invented for the purpose of putting into practice my newly discovered method.

This discovery and the consequent invention is broadly new, basic and pioneer and the apparatus and various parts thereof which I have provided for use in conducting such method are of a like nature.

Broadly new, basic and pioneer features of this invention includes, in combination, a container adapted to hold liquid under air pressure; means to allow and control discharge of liquid from such container; an air pressure gage having an indicator operable by the compressed air in the container and calibrated with relation to the various stages of air pressure in the container so that the attendant may determine by the indicator the volume of the liquid contents of the container, and consequently the amount discharged.

It is found in practice that transmission lubricants can be packed in transmission cases under high pressures only; as pressures ranging from about fifty pounds per square inch and up; this is especially true in cold weather when the lubricant may approach a solid state.

An object of this invention is to provide simple, inexpensive, easily operated, safe, portable means for delivering accurately measured quantities of liquids such as grease, lubricating oil, kerosene, gasoline and other non-compressible fluids.

A further object of the invention is to minimize the number of movable parts for controlling the delivery and determining the amount of liquid delivered.

This invention is broadly new, basic and pioneer in that provision is made for discharging from a container, the liquid contents thereof by predetermined air pressures; and a feature of the invention consists in a calibrated pressure gage constructed with lost motion to prevent the lowering of air pressure from affecting the gage except when such lowering is caused by delivery of the liquid at the outlet of the apparatus. Necessarily such delivery must begin under a predetermined pressure, which is slowly reduced as liquid escapes, and is rapidly reduced when air escapes.

An object of the invention is to prevent registration or indication of any reduced pressure except that which is caused by discharge of liquid.

A further broadly new, basic and pioneer feature of the invention is the provision of a container provided with two compartments, one to initially contain only the liquid to be dispensed and the other to initially contain the air under pressure; there being a normally closed valve between the two compartments adapted to be opened by the air pressure when an outlet for the liquid is opened so that the air may then operate to discharge the liquid at the outlet.

In carrying out this invention, I provide a container of known cubical contents with a partition dividing the chamber of the container into two compartments of known cubical contents respectively, one for the liquid and the other for the air at the outset, after complete charging, and provide the partition with a port and a yielding closure therefor to allow air to pass to the liquid and to prevent liquid from entering the air chamber during filling operation.

The purpose of this partition is to predetermine the volume of liquid with which the container may be charged at the outset, and consequently the volume of air that can be applied to the container after the liquid charge has been introduced; and the purpose of the port is to allow the air pressure to be applied to the liquid to expel the same through a valve controlled outlet, thus allowing the air to expand in the container in exact relation to the discharge of liquid; so that measurement of the air pressure by the pressure gage affords an indication of the volume of liquid discharged.

An advantage arising from this method of measuring liquids is the freedom from moving parts in contact with the liquid.

Another feature is the arrangement whereby the container is adapted to be brought into a practically horizontal position for filling and into practically upright position for discharging.

Another object of the invention is to avoid likelihood of blowing contents of the liquid compartment out through the filling opening when the stopper for such opening is being removed.

My invention is particularly directed to an apparatus for and method of dispensing liquid by compressed air and a distinct feature is an indicator which will tend to prevent the discharge of the compressed air along with the liquid by an indication of a fully discharged condition of the liquid while there yet remains a volume of compressed air sufficient for the expelling of the liquid.

Other objects, advantages and features of invention may appear from the accompanying drawing, the subjoined detailed description and the appended claims.

The accompanying drawing illustrates the invention.

Figure 1 is a vertical mid-section of an apparatus constructed in accordance with this invention.

Fig. 2 is an enlarged front view of the volumetric gage.

Fig. 3 is an enlarged view of the interior works of the calibrated air gage and liquid volumeter.

Fig. 4 is an enlarged fragmental detail partly in section, of the expanding element of the gage and the lost motion connection therewith of the index hand operating mechanism.

Fig. 5 is an edge view of the gage.

Fig. 6 is an enlarged sectional detail of the valve between the two compartments.

Fig. 7 is an enlarged detail of the vented filling plug.

The container 1 is shown as a cylinder having a height about twice its diameter, although such proportions are determined by the judgment of the constructor.

2 is an impervious rigid partition dividing the interior of the container into the air compartment 3 and liquid compartment 4.

5 is a port by which pressure may be applied from the pressure chamber 3 to the liquid compartment 4.

6 is a valve to close the port against admission of liquid to the air compartment 3 from the liquid compartment 4.

7 is the filling inlet closed by a threaded hollow plug 8 having a vent 9 in the threaded portion adapted to be exposed to open air after the plug has started for removal.

10 is a flange on the plug to compress the gasket 11 to make the liquid filling inlet absolutely air and liquid tight.

12 is a truck mounted on the side of the container, opposite to the inlet 7, and 13 is a handle fixed to the container on the same side, for handling the truck and adapted to form a leg cooperating with the truck wheels 14 to support the container in horizontal position with the liquid inlet 7 up.

The handle and wheels are of such dimensions and relation to the container, that a straight line $h$ drawn from the tip of the handle to the periphery of the wheel at right angles to a horizontal line 15 drawn through the axis 16 of the wheel when the container is upright, is approximately parallel to the longitudinal axis 17 of the container, and at right angles to the base 18, so that when the container is tilted back to rest on the truck wheels and the tip of the handle, the container will be in approximately true horizontal position, with the inlet 7 up, so that upon removal of the plug 8, liquid may be poured into the container to completely fill the compartment 4 while the port 5 is closed by the valve 6; after which the plug 8 will be returned to the inlet 7 and the container may be brought to vertical position as shown in Fig. 1. Thus, by means of the handle 13 and the wheel 14 acting as a fulcrum, the tank may be oscillated from horizontal filling to upright discharging positions.

The outlet 19 for liquid is located slightly above the bottom of the liquid compartment 4 and is connected by a hose 20 with a nozzle 21 controlled by a cock 22.

23 indicates a nipple to receive a connection, not shown, of an air pressure hose, not shown, to fill the air compartment 3.

24 indicates a valve to control the air inlet into the compartment 3 from the nipple 23.

25 indicates an air pressure gage and liquid volumeter having an index hand 26 and a dial 27.

28 is a set hand to determine the point at which the indicating hand 26 will stand as a starting point, for liquid discharge.

29 is the flexible spring indicator-operating gage element connected through the usual port 30 with the compartment 3 so that the compressed air in the compartment 3 may tend to straighten said element in correspondence to the pressure inside the same in accordance with well known principles of pressure gages.

31 is the stationary frame in which the spindle 32 of the index hand 26 is journalled in the usual way.

33 is the pinion on such spindle. 34 is the segmental rack, which operates the pinion and which is mounted on the axis 35 that is pivoted in the frame.

36 is a shaft fixed to the end of the pressure operated element 29 and connected to the segmental rack 34 by a lost motion connection comprising a pin 37 fixed to the shank and operating in a slot 38 of a link 39 that is pivoted to the power end of the segmental rack.

40 is a hair spring connecting the post of the hand to the frame for the purpose of taking up the lost motion in the connection of the segmental rack with the element 29 and to return the hand to normal position.

In practice, to charge the apparatus, the attendant will close the nozzle valve-cock 22 and will bring the container to horizontal position and remove the plug 8. If there is unexhausted air pressure in the container, it will flow out through the vent 9 shortly after the plug has been started to unscrew, and the attendant may then delay the further unscrewing of the plug until the air in the container is entirely exhausted.

When the plug has been removed, the compartment 4 may be filled by pouring the lubricant or other liquid through the liquid inlet until the compartment 4 is filled; thereupon the plug will be screwed home and the container will be brought into vertical position. Then the attendant will apply the applicator of the compressed air filling hose, not shown, to the nipple 23 and by opening the valve 24 will allow air under pressure to enter the compartment 3 until the index hand stands at the predetermined pressure which for example may be 100 pounds to the square inch.

Then the air valve 24 will be closed, and the filling hose, not shown, detached from the nipple 23.

The air pressure from compartment 3 is then available to dispense the grease or other contents from the container through the nozzle 21 upon opening the valve 22 by which the discharge of liquid may be controlled.

I have discovered that in order to cause the discharge through the nozzle to be properly measured by the gage, it is necessary that an air pressure sufficient to expel the liquid from the container be established before the index hand is moved by such air pressure; and in order to secure such action, I have provided lost motion means between the pressure actuated element 29 and the rack 34 that operates the pinion 33, and in order that this action may be understood the connection between the pinion and the element 29 are shown in Fig. 4 in the "Empty" position with the hair spring 40 acting through the pinion 32 and the segmental rack 34 to hold the end of slot 38 swung against the pin 37; so that when the air pressure from the container causes the element 29 to straighten, the pin 37 must travel along the slot to the further end thereof before it acts upon the link 39, and connected parts, to move the hand; and when the last measure of liquid is dispensed through the nozzle, sufficient air pressure remains to expel such liquid as may cover the outlet to the nozzle; and the link 39 is held by the pin 37 at the initial rest position until the gage element 29 is relaxed by release of air pressure preparatory to re-filling the compartment 4 with liquid.

When the liquid compartment of the container is filled with liquid and a pressure is applied in compartment 3 through the valve 23, the first movement of the element 29 caused by such air pressure, shifts the pin 37 from the "Empty" position to the further end of the slot 38 before causing any movement of the rack 34, pinion 33 and hand 26; and in this manner there must always be applied to the container an initial air pressure not shown by the hand, and which will remain and be effective to complete the emptying operation at the close of the final measured discharge.

By this arrangement a complete discharge of liquid will be effected with a proper registration by the gage, of the exact volume expelled up to the moment the hand reaches the "Empty" position at *f* in Fig. 2, at which moment the attendant will close the valve 22 while there is yet a predetermined air pressure in the container.

Each discharge of liquid is effected and controlled by manipulation of the nozzle valve by the operator who thereby releases the liquid in a stream through the nozzle, meanwhile noting the movement of the hand in combination with the volumetric markings *b*, *c*, *d*, *e*, on the dial; and the nozzle valve will be closed by the operator when the hand reaches the place indicating that the required volume of liquid has been discharged.

When the nozzle is closed after the first discharge of grease from the nozzle, the operator will set the set hand to mark the point at which the index hand 26 stands so that when the operator opens the nozzle valve to allow a further amount of liquid to be discharged, he can, by observing the movement of the index hand relative to the set-hand, note the amount of liquid being discharged through the nozzle. The space between the set-hand and the index hand indicates the volume of liquid discharged at that operation.

The drawing indicates an apparatus adapted to contain twenty-five points of liquid when fully charged. Said dial is calibrated beginning with characters increasing to the left around the dial from the point *a* marked "Stop." Said characters may be of such value and location as may be determined by the capacity of the apparatus to which the dial belongs. Said characters in the view are indicated at *b*, *c*, *d* and *e* to show the various amounts of liquid discharged when the index hand pointer is at the various markings, spaced from the set-hand 26.

It is understood that when the compartment 4 has been charged with liquid and the container has been brought to vertical position, and as air is compressed into the compartment 3, the hand shown in Fig. 2 as standing at "Empty," will move from left to right until it comes to a stop at the zero point *a*; and that as the liquid is allowed to discharge from the nozzle, said hand will move from right to left toward the "Empty" position.

The dial is shown graduated for quantities of 5 pints, 10 pints, 15 pints, 20 pints and 25 pints, and the successive spaces between the points *a*, *b*, *c*, *d*, *e* and *f* will each be graduated to indicate individual pints; there being four graduations between each two of the numbered marks so that as the index hand moves from right to left the amount of liquid discharged will be indicated by the passage of the index hand relative to the markings, and the total amount discharged at that particular operation will be indicated by the space between the set-hand 28 and the gage hand 26.

In the apparatus from which the drawing of Fig. 1 was made, the compartment 3 of the container holds exactly 32½ pounds of water and the compartment 4 contains 34½ pounds of water, and the gage for use with said container having the indicated cubical contents in its two compartments 3 and 4 respectively, was set by applying to the closed empty container to which the gage is attached, an initial air pressure sufficient to move the pin 37 from the position shown in Fig. 4 to the further end of the slot 38, and the resistance of the element 29 was such that the air pressure at the point where the element 29 caused the pin 37 to begin to move the link 39, was 50 pounds per square inch, and the pressure required to move the hand from the "Empty" position *f* to the "Stop" position *a*, was 50 pounds more, so that the air pressure necessary to hold the hand 26 at the "Stop" position *a* was 100 pounds per square inch, as indicated by the mark "100" adjacent to the word "Stop" in Fig. 2.

With the gage thus set, the air pressure was released and the compartment 4 was filled with liquid while the container was in horizontal position, supported by the wheel fulcrum 14 and the handle 13; then the liquid inlet 7 was closed by the plug 8 and the container was then brought into upright position as shown in Fig. 1 and compressed air was applied to compartment 3 through the compressed air valve 24 until the hand stood at the "Stop" position *a*, indicating 100 pounds air pressure in the compartment 3; then the discharge valve 22 was opened and liquid allowed to flow through the nozzle, in consequence of the air pressure, until a one pint measure was filled. The position occupied by the hand on the dial at that point was marked accordingly. Another one pint measure was then drawn, and the operation was repeated until the hand stood at the "Empty" position, so that at that point, the air pressure in the container stood at 50 pounds per square inch, and the hose 20 was exactly full of grease.

In the case of dispensing grease, the hose remains filled when the indicating hand indicates "Empty", and said term "Empty" is not intended to mean that no liquid remains at the bottom of the container, but is employed to deter the operator or attendant from dispensing grease from the nozzle after the hand ceases to indicate.

Owing to the necessity of providing at the outset a sufficient quantity of air to properly begin, and at intervals to properly continue the operation until the last pint to be discharged is expelled, the space between *a* and *b* is greater than the space between *b* and *c*, which space is likewise greater than the space between *c* and *d* and so on to the empty point.

The calibration of the dial will be made from actual measurement as follows: The gager will charge the container with liquid and compressed air as hereinbefore outlined, and then will draw off through the nozzle into one or more liquid measures, measured quantities of liquid; and as each liquid measure unit of volume is drawn out, the dial will be marked at the point at which the gage hand then stands, the marking being in terms of liquid measure to indicate each unit, and so on until the marking of the dial is completed.

By this means the discharge of liquid from the container after subsequent fillings of the liquid compartment with liquid, and the air compartment with air to the predetermined high pressure, will cause the indicator to indicate the amount discharged between each opening and closing of the nozzle.

I claim:—

1. A liquid measuring device comprising a container; means to allow and control discharge of liquid from the container; means to hold a given quantity of air under pressure on top of the liquid in the container for the purpose of forcing the liquid out of the container, and a calibrated air gage having a dial and an indicating hand in connection with the dial and operable by change of air pressure in the container, for the purpose of indicating changes in the volume of liquid discharge according to the pressure of the air-filled space of the container; said gage being provided with lost motion means whereby air pressures below a predetermined amount will not be indicated by the hand.

2. An apparatus of the class described comprising a container; a partition forming distinct compartments in the container; a valve controlled port in the partition; a filling inlet to one of the compartments; means for oscillating the container and supporting the same in the filling and also in the discharging position; a valve controlled discharge outlet to the compartment having the filling inlet; means for admitting and holding a volume of fluid under pressure in the other compartment, and a pressure operated, volume indicating gage in communication with the last mentioned compartment.

3. An apparatus of the class described comprising a compartment, for a liquid to be dispensed, and a compartment for a fluid under pressure for the dispensing of the liquid; a communication between the compartments including a one-way valve; a filling inlet and a manually operated valve controlled outlet for the liquid compartment; means for admitting and holding fluid under pressure in the fluid compartment; a gage for the fluid compartment including a pressure controlled element, a hand and a connection between the pressure controlled element and the hand providing pressure indication less than actual pressure in the container, whereby liquid discharge may be effected by the fluid under pressure and at indications by the gage including non-discharging condition of the fluid.

4. In an apparatus of the class described, a container for liquid; a container for air; a communication between the containers comprising a one-way valve; a filling inlet for the liquid compartment; an outlet comprising a hose and a valved nozzle, for the liquid compartment; charging means for the air compartment and means actuated by pressure in the air compartment for the indication, by volumetric measure, of discharged quantities of liquid and comprising a graduated dial and a hand adapted for co-operation to indicate, at times, an inoperative air pressure, when the actual pressure is operative.

5. The combination with a liquid dispensing apparatus operable by a fluid under pressure; of a pressure indicator comprising a graduated dial, a movable hand, an element influenced by pressure of the fluid and a connection between said element and hand affording a greater movement of said element as effected by actual pressure than the movement of said hand as related to the dial.

In testimony whereof, I have hereunto set my hand at Los Angeles, California, this 22d day of April, 1926.

THEODORE EDWARD BAKER.